(12) United States Patent
Zhang et al.

(10) Patent No.: US 10,639,643 B2
(45) Date of Patent: May 5, 2020

(54) SYSTEM AND METHOD FOR PROCESSING OBJECTS HAVING CHEMICAL CONTAMINATES

(71) Applicant: Li Tong (H.K.) Telecom Company Limited, Fotan, N.T. (HK)

(72) Inventors: Lei Zhang, Hao (CN); Ming-Tong Wang, Shatin (HK)

(73) Assignee: LTG GREEN-TECH R & D COMPANY LIMITED, Tortola (VG)

(*) Notice: Subject to any disclaimer, the term of this patent is extended or adjusted under 35 U.S.C. 154(b) by 1095 days.

(21) Appl. No.: 14/059,944

(22) Filed: Oct. 22, 2013

(65) Prior Publication Data
US 2014/0175196 A1  Jun. 26, 2014

(30) Foreign Application Priority Data

Dec. 21, 2012  (HK) .................................. 12113252.2

(51) Int. Cl.
| | | |
|---|---|---|
| B02C 23/20 | (2006.01) | |
| B02C 19/00 | (2006.01) | |
| B02C 23/10 | (2006.01) | |
| B09B 3/00 | (2006.01) | |
| B03B 9/06 | (2006.01) | |
| B29B 17/02 | (2006.01) | |
| B29L 31/00 | (2006.01) | |

(52) U.S. Cl.
CPC .......... *B02C 19/0056* (2013.01); *B02C 23/10* (2013.01); *B02C 23/20* (2013.01); *B03B 9/061* (2013.01); *B09B 3/00* (2013.01); *B09B 3/0091* (2013.01); *B29B 17/02* (2013.01); *B29B 2017/0272* (2013.01); *B29B 2017/0293* (2013.01); *B29L 2031/7678* (2013.01); *Y02W 30/521* (2015.05); *Y02W 30/526* (2015.05); *Y02W 30/622* (2015.05)

(58) Field of Classification Search
CPC ..... B02C 19/0056; B02C 23/20; B02C 23/10; B29B 17/02; B29B 2017/0293; B29B 2017/0272; B03B 9/061; B09B 3/0091; B09B 3/00; Y02W 30/622; Y02W 30/526; Y02W 30/521; B29L 2031/7678
USPC ............................ 241/17, 18, 19, 60, 65, 66
See application file for complete search history.

(56) References Cited

U.S. PATENT DOCUMENTS

| | | | | |
|---|---|---|---|---|
| 4,005,568 A | * | 2/1977 | Folk ......................... | D01H 4/24 57/302 |
| 4,076,578 A | * | 2/1978 | Puddington ............ | D21O 5/025 162/5 |
| 5,334,285 A | * | 8/1994 | Ortner .................... | D21B 1/021 162/4 |
| 5,376,143 A | * | 12/1994 | Wasinger ........... | D06B 11/0096 8/101 |
| 7,162,785 B2 | * | 1/2007 | Koumura ................ | B03B 9/061 241/24.1 |

(Continued)

*Primary Examiner* — Anthony D Stashick
*Assistant Examiner* — Onekki P Jolly
(74) *Attorney, Agent, or Firm* — Renner Kenner Greive Bobak Taylor & Weber (57) ABSTRACT

A system and method for processing objects having chemical contaminates includes a shredding module arranged to shred the objects to form a plurality of shredded fragments, each having the chemical contaminates, and a separating module arranged to separate the chemical contaminates from the shredded fragments.

13 Claims, 5 Drawing Sheets

(56) References Cited

U.S. PATENT DOCUMENTS

| | | | | |
|---|---|---|---|---|
| 7,451,943 B2* | 11/2008 | Marko | ............... | C09D 11/30 |
| | | | | 241/16 |
| 7,883,041 B2* | 2/2011 | Ishikawa | ........... | B02C 17/161 |
| | | | | 241/171 |
| 2005/0106367 A1* | 5/2005 | Raksha | ............ | B05D 3/207 |
| | | | | 428/199 |
| 2006/0119672 A1* | 6/2006 | Tran | ................ | B41J 2/17506 |
| | | | | 347/85 |
| 2012/0199675 A1* | 8/2012 | Kulesa | ............ | B29B 17/0026 |
| | | | | 241/15 |

* cited by examiner

SYSTEM AND METHOD FOR PROCESSING OBJECTS HAVING CHEMICAL CONTAMINATES

TECHNICAL FIELD

The present invention relates to a system and method for processing objects having chemical contaminates, and particularly, although not exclusively, to a system and method for processing objects which are contaminated by printing ink.

BACKGROUND

Ink jet printers are low cost printing solutions which are popular with many commercial and home environments. As a popular printing and copying solution, ink jet printers often utilize ink cartridges or containers which are used to store ink to be used by the printer or copier to print images or text.

Due to the contaminating nature of ink as well as its harmful chemical properties, used ink cartridges or containers have become a significant environmental concern. The toxic nature of the chemicals used to manufacture ink has made these containers a potential environmental hazard when disposed in a landfill as the ink can escape into the ground and run into waterways or ground water. In addition, the chemical composition of ink also contaminates the materials used in the manufacturing of these cartridges and containers and in turn makes the recycling process of these cartridges and containers very expensive and difficult.

SUMMARY OF THE INVENTION

In accordance with a first aspect of the present invention, there is provided a system for processing objects having chemical contaminates comprising:
  a shredding module arranged to shred the objects to form a plurality of shredded fragments, each having the chemical contaminates; and
  a separating module arranged to separate the chemical contaminates from the shredded fragments.

In an embodiment of the first aspect, the system further comprises a dissolving module arranged to substantially dissolve the chemical contaminates of the shredded fragments.

In an embodiment of the first aspect, the dissolving module includes a steamer arranged to apply steam to the shredded fragments.

In an embodiment of the first aspect, the dissolving module is arranged to substantially dissolve the chemical contaminates of the shredded fragments before the chemical contaminates are separated from the shredded fragments.

In an embodiment of the first aspect, the separating module includes a spinning apparatus arranged to spin the shredded fragments to separate the chemical contaminates from the shredded fragments.

In an embodiment of the first aspect, the spinning apparatus includes a cylinder which is arranged to spin so that the shredded fragments are retained within the cylinder whilst the chemical contaminates substantially depart from the cylinder.

In an embodiment of the first aspect, the cylinder is arranged to spin such that the shredded fragments depart from the cylinder at the top of the cylinder.

In an embodiment of the first aspect, the system further comprises a dryer arranged to reduce the moisture of the shredded fragments.

In an embodiment of the first aspect, the dryer is arranged to supply airflow to the shredded fragments.

In an embodiment of the first aspect, the system further comprises a metal separating module arranged to separate metallic fragments from the shredded fragments.

In an embodiment of the first aspect, the metal separating module includes a magnetic roller tube arranged to remove metallic fragments by rolling over the shredded fragments and removing the metallic fragments by magnetic force.

In an embodiment of the first aspect, the system further comprises a light fragment removing module arranged to remove light fragments from the shredded fragments.

In an embodiment of the first aspect, the light fragment removing module includes a blower unit arranged to blow away the light fragments from the shredded fragments.

In an embodiment of the first aspect, the light fragment removing module includes a suction unit arranged to suck away the light fragments from the shredded fragments.

In an embodiment of the first aspect, the light fragments include sponges, paper fragments or a combination thereof.

In an embodiment of the first aspect, the system further comprises a vibration module arranged to disturb the shredded fragments.

In an embodiment of the first aspect, the objects with chemical contaminates are used ink cartridges.

In an embodiment of the first aspect, the chemical contaminates are ink.

In accordance with a second aspect of the present invention, there is provided a system for processing used ink cartridges comprising:
  a shredding module arranged to shred the used ink cartridges to form a plurality of shredded fragments;
  a dissolving module arranged to substantially dissolve the ink of the shredded fragments;
  a separating module arranged to separate the ink from the shredded fragments;
  a dryer arranged to reduce the moisture of the shredded fragments;
  a metal separating module arranged to separate metallic fragments from the shredded fragments; and
  a light fragment removing module arranged to remove light fragments from the shredded fragments.

In an embodiment of the second aspect, the system further comprises a vibration module arranged to disturb the shredded fragments.

In accordance with a third aspect of the present invention, there is provided a method for processing objects having chemical contaminates comprising the steps of:
  shredding the objects to form a plurality of shredded fragments each having the chemical contaminates; and
  separating the chemical contaminates from the shredded fragments.

In an embodiment of the third aspect, the method further comprises the step of: substantially dissolving the chemical contaminates of the shredded fragments.

In an embodiment of the third aspect, the step of dissolving the chemical contaminates includes steaming the shredded fragments.

In an embodiment of the third aspect, the step of dissolving the chemical contaminates is arranged to substantially dissolve the chemical contaminates of the shredded fragments before the chemical contaminates are separated from the shredded fragments.

In an embodiment of the third aspect, the step of separating the chemical contaminates includes spinning the shredded fragments to separate the chemical contaminates from the shredded fragments.

In an embodiment of the third aspect, the step of spinning the shredded fragments includes the use of a cylinder arranged to spin the shredded fragments such that the shredded fragments are retained within the cylinder whilst the chemical contaminates substantially depart from the cylinder.

In an embodiment of the third aspect, the cylinder is arranged to spin such that the shredded fragments depart from the cylinder at the top of the cylinder.

In an embodiment of the third aspect, the method further comprises the step of reducing the moisture of the shredded fragments.

In an embodiment of the third aspect, the step of reducing the moisture of the shredded fragments uses a dryer arranged to supply airflow to the shredded fragments.

In an embodiment of the third aspect, the method further comprises the step of separating metallic fragments from the shredded fragments.

In an embodiment of the third aspect, the step of separating metallic fragments uses a magnetic roller tube arranged to remove metallic fragments by rolling over the shredded fragments and removing the metallic fragments by magnetic force.

In an embodiment of the third aspect, the further comprises the step of removing light fragments from the shredded fragments.

In an embodiment of the third aspect, the step of removing the light fragments from the shredded fragments uses a blower unit arranged to blow away the light fragments from the shredded fragments.

In an embodiment of the third aspect, the step of removing the light fragments from the shredded fragments uses a suction unit arranged to suck away the light fragments from the shredded fragments In an embodiment of the third aspect, the light fragments include sponges, paper fragments or a combination thereof.

In an embodiment of the third aspect, the method further comprises the step of disturbing the shredded fragments.

In an embodiment of the third aspect, the objects with chemical contaminates are used ink cartridges.

In an embodiment of the third aspect, the chemical contaminates are ink.

In accordance with a fourth aspect of the present invention, there is provided a method for processing used ink cartridges comprising the steps of:
- shredding the used ink cartridges to form a plurality of shredded fragments;
- substantially dissolving the ink of the shredded fragments;
- separating the ink from the shredded fragments;
- reducing the moisture of the shredded fragments;
- separating metallic fragments from the shredded fragments; and
- removing light fragments from the shredded fragments.

In an embodiment of the fourth aspect, the method further comprises the step of disturbing the shredded fragments.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
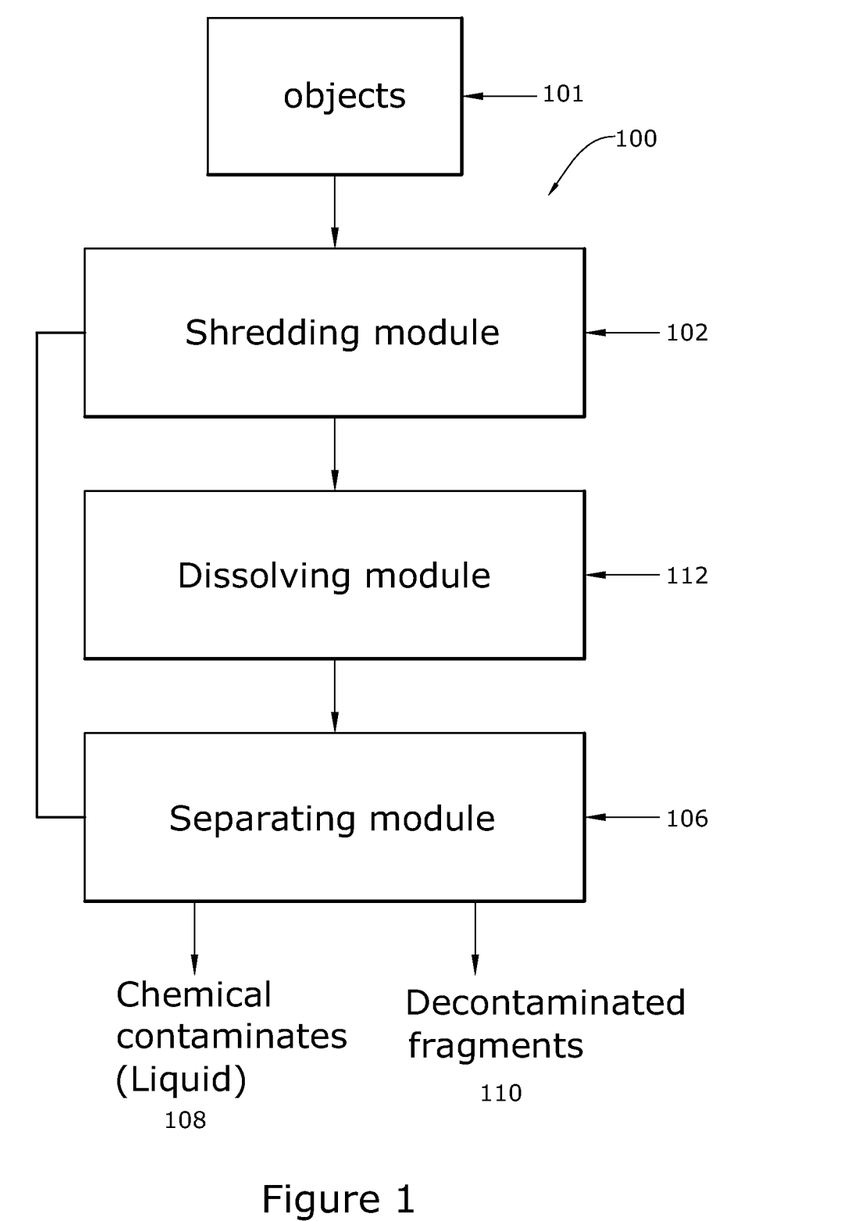
FIG. 1 is a block diagram of a system for processing objects having chemical contaminates in accordance with one embodiment of the present invention.

With reference to FIG. 1, there is shown a system 100 for processing objects having chemical contaminates comprising: a shredding module 102 arranged to shred the objects to form a plurality of shredded fragments; and a separating module 106 arranged to separate the chemical contaminates from the shredded fragments. Preferably, in some example embodiments, the system 100 also includes a dissolving module 112 arranged to substantially dissolve the chemical contaminates of the shredded fragments.

In this embodiment the system 100 is arranged to process various types of objects which have chemical contaminates. Examples of these types of objects include articles such as containers, housing or components which may have been contaminated by chemical contaminates such as ink or solidified forms of ink or other types of chemicals in liquid or solid form. In these examples, the containers, housing or components may be ink containers or cartridges which are used as storage of ink or a reservoir for ink or other colouring agent in a printer or photocopying device.

In many examples, these ink cartridges or containers may be made from plastic to define the general housing and may include various metallic components which are used to engage the cartridge within a copier or printer or otherwise use to secure the cartridge or container during its use. In some other examples, the ink cartridges may also include smaller components of electronics such as printed circuit boards or sensors. The cartridges may also have plastic sponges or paper filters or other components which are used to regulate the manner in which the cartridge feeds ink to a copier or printer or control the movement of the ink within each of the cartridges.

Due to the chemical nature of the ink which is stored in these cartridges, particularly in instances where the chemical properties of these inks are oil-based, or have other similar toxic compounds, it is preferred that the ink is separated from all of the other components of the cartridge during disposal. This is because disposal of cartridges which has not have the ink removed may result in the ink being released into waterways or ground water through run offs. Accordingly the system for processing objects having chemical contaminants may be advantageous in processing used ink cartridges or containers as the residual ink and other toxic chemical contaminates in these cartridges can be separated from the core components of the ink cartridges or containers and thus reduce the risk of environmental damage and costs to recycle the cartridges and containers.

In the embodiment shown in FIG. 1, any object such as an ink cartridge which has chemical contaminates can be firstly placed into a shredding module 102 arranged to shred the object into shredded fragments 104. Whereupon the system 100 is arranged to process used ink cartridges or containers, these shredded fragments 104 may include plastic chips which are formed from the shredding of a plastic housing of the object, and metallic fragments which were generated from the shredding of the metallic components found in the object. Preferably, the shredding module 102 has a heat exchanger or cooling system arranged to cool the shredder during use so that additional heat generated from the shredding process does not cause a further chemical reaction or combustion of the chemical contaminates which are found in the shredded fragments 104.

Once these shredded fragments are produced by the shredding module 102, the fragments 104 are then delivered to a separating module 106 which is arranged to separate the chemical contaminates 108 and the shredded fragments 104. Preferably, the separating module 106 comprises a cylinder which is arranged to spin such that the chemical contaminants 108 may be spun away from the shredded fragments 104 and thus allowing the chemical contaminants 108 to be collected whilst allowing the shredded fragments 104 to be removed separately. One embodiment of the separating module 106 is described further below with reference to FIG. 2A.

Figure 2:
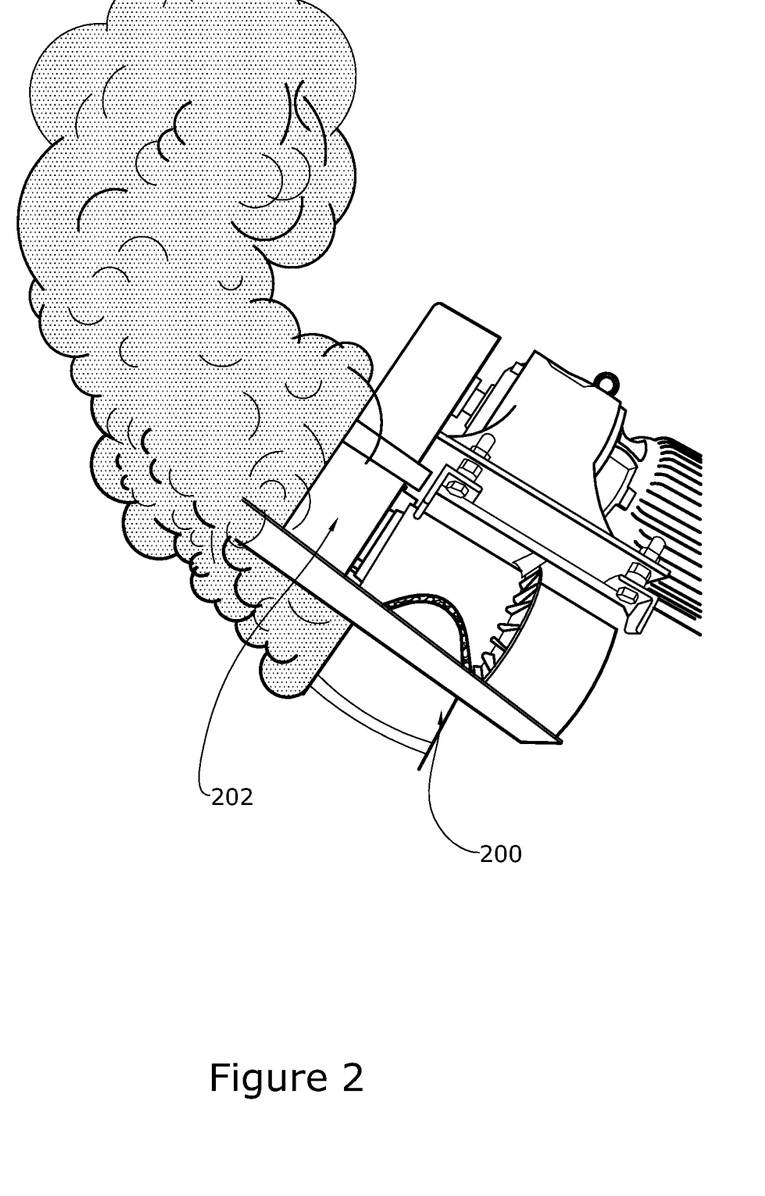
FIG. 2 is a photograph of an embodiment of a dissolving module of one embodiment of the system shown in FIG. 1.

In this embodiment, the system 100 includes a dissolving module 112 which is arranged to operate between the shredding module 102 and the separating module 106. In examples where the chemical contaminates are not in liquid form, or may require a further chemical processing before it is brought into substantially liquid form, a dissolving module 112 may be arranged to substantially dissolve the chemical contaminates on the shredded fragments such that these chemical contaminates can be more effectively removed from the shredded fragments 104. Preferably, as shown in FIG. 2, the dissolving module includes a steamer unit 200 which is arranged to emit steam onto the shredded fragments 104. This provides two effects, firstly, the steam proceeds to moisturize these fragments 104 and thus turn some of the solidified chemical contaminates into liquid form. In addition, as the steam is hot and may be emitted with pressure, the fragments 104 may in turn be heated to an elevated temperature and thus assisting in dissolving the chemical contaminants which reduces the effort required in its separation from the fragments 104.

In some embodiments, other chemicals may also be used to dissolve the chemical contaminants 108. However, steam is a preferred example as steam can be generated at low costs. Also, since steam is effectively boiling water its use and escapement to the environment will not cause environmental damage whereas the usage of chemical solvents to remove the chemical contaminates may cause environmental harm.

Figure 2A:
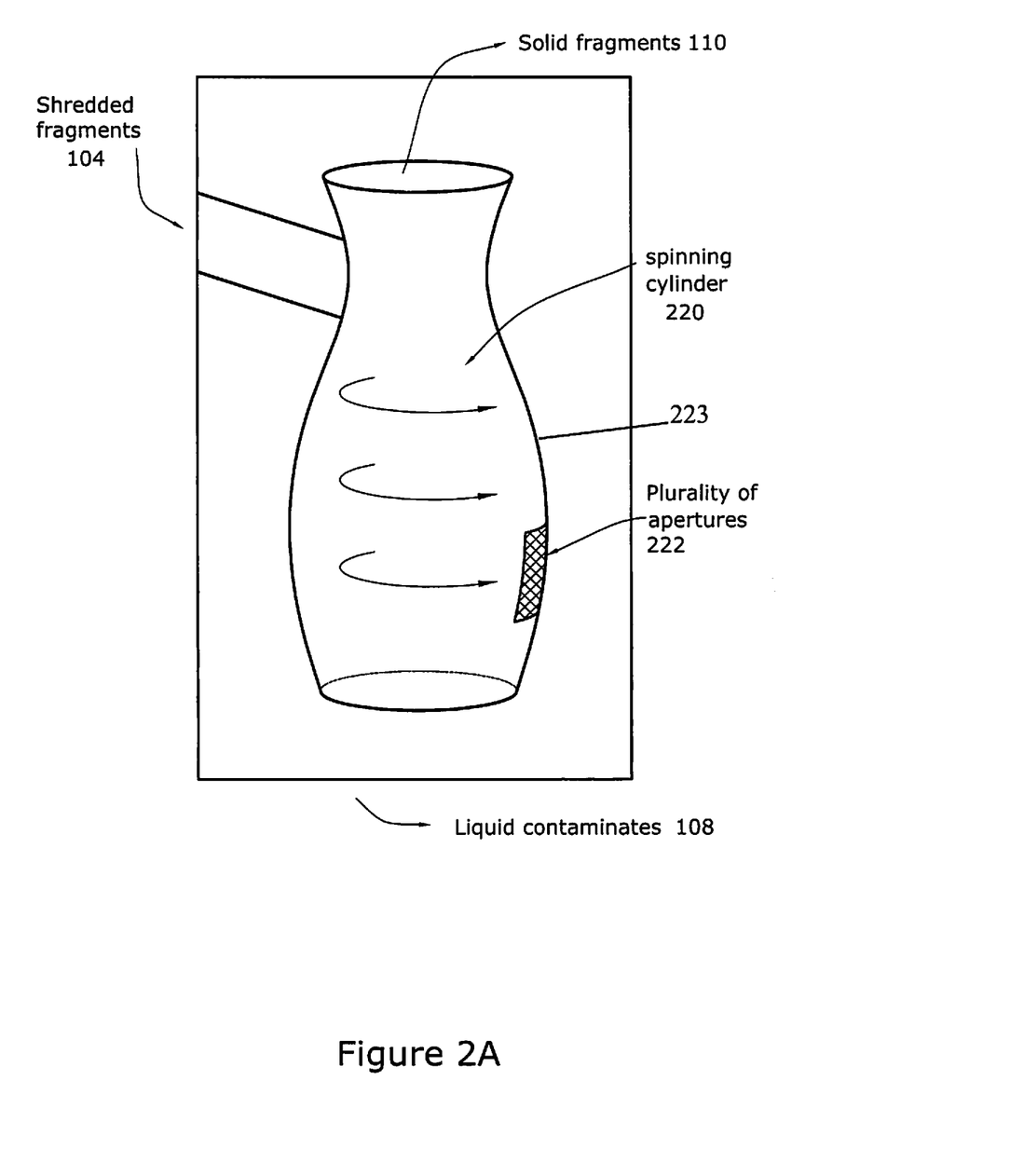
FIG. 2A is cut away diagram of an embodiment of a separating module of one embodiment of the system shown in FIG. 1.

Once the dissolving module 112 has completed the dissolving process of the chemical contaminants 108, the fragments 104 are then placed into the separating module 106 mentioned above. In these instances, as the chemical contaminants 108 may have been substantially dissolved or liquefied by the dissolving module 112, the separating module 106 may effectively spin dry the fragments 104 by spinning the wet or moist fragments 104. With reference to FIG. 2A, there is shown a schematic diagram of a separating module 106 which comprises a spinning cylinder 220 arranged to spin the fragments 104. As the fragments 104 may be moist, the liquids which may be the chemical contaminates or dissolved chemical contaminates are effectively driven to the side or bottom of the spinning cylinder 220 due to the centrifugal force generated by the spinning cylinder 220 and may be released from the cylinder 220 through apertures 222 in a sidewall 223 of the cylinder 220 or through the bottom of the cylinder. In this embodiment, the sidewall 223 is also curved (as exemplified in FIG. 2A) such that the solid fragments 110 are spun to the top of the cylinder whilst the chemical contaminates, which by this stage may be largely in liquid form will be spun to the bottom of the spinning cylinder. This effectively allows the chemical contaminates to be separated from the solid fragments and collected at either end for further processing or recycling.

With reference to FIG. 2 there is illustrated a steamer unit 200. In this embodiment the steamer unit 200 includes a head 202 arranged to deliver steam to a plurality of shredded fragments 104 from a shredding module 102. Preferably, the steamer unit 200 delivers steam to a plurality of shredded fragments 104 when the fragments are on a conveyor belt 303 arranged to deliver the shredded fragments from the shredding module 102 to the separating module 106. In this example, the head 202 of the steamer unit 200 is arranged to apply steam to the shredded fragments 104 on the conveyor belt as the conveyor belt transfers each of the shredded fragments 104 to the next phase for the next processing module.

In another embodiment, the conveyor belt 303 may be implemented such that the belt 303 is integrated with an example of a steamer unit 200 so as to deliver steam to the plurality of shredded fragments 104. In this embodiment, the conveyor belt 303 is arranged to receive the fragments 104 from the shredding module 102 and when the fragments 104 are disposed on the conveyor belt 303, the integrated steamer is arranged to deliver steam directly onto the fragments 104 on the conveyor belt.

Figure 3:
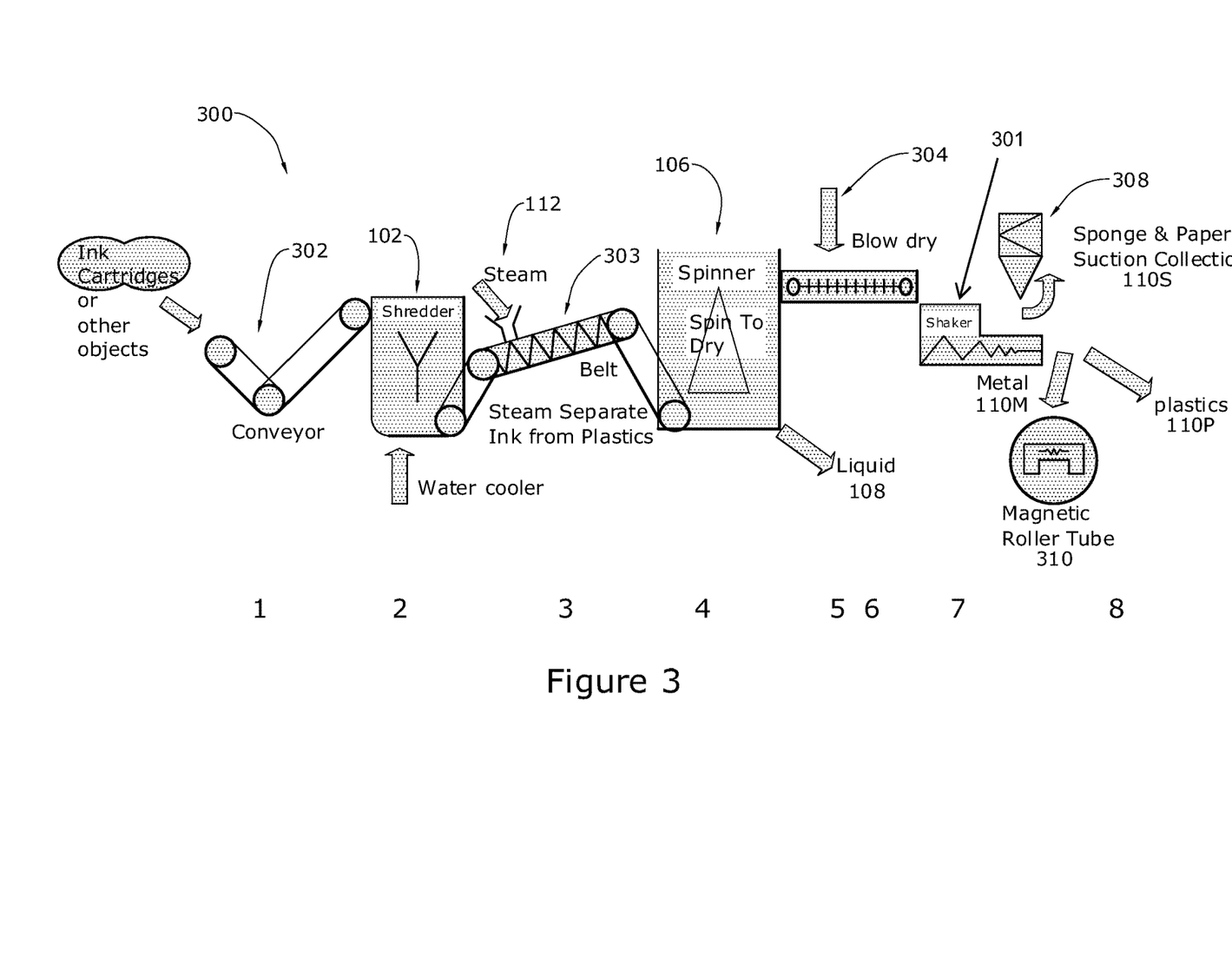
FIG. 3 is a process block diagram of a system for processing objects having chemical contaminates in accordance with another embodiment of the invention.

With reference to FIG. 3 there is illustrated a block diagram of the process in which an object such as an ink cartridge may be processed by one embodiment of a system or processing objects having chemical contaminates. In this embodiment, the system 300 is arranged to receive the objects 101 and delivers the objects 101 to the shredding module 102 via a conveyor belt system 302. Once the objects 101 reach the shredding module 102, the shredding module 102 may proceed to shred the objects 101 into shredded fragments 104. Preferably, as shown in FIG. 3, the shredding module 102 includes a cooling system whereby water is used to cool the shredder from the heat generated through the shredding process. This is advantageous in that the lifespan of the shredder is increased due to the decreased stress from heat whilst also minimizing the risk of chemical reactions with the chemical contaminants by reducing heat.

Once the shredded fragments 104 are released from the shredding module 102 a conveyor belt 303 is arranged to deliver the fragments 104 to the separating module 106 to separate the chemical contaminants 108 from the fragments 110. In this embodiment, a steamer unit 200 as shown in FIG. 2 is used to apply steam to the shredded fragments 104 on the conveyor belt 303. By applying steam to the fragments 104, the chemical contaminants on the shredded fragments 104 are at least partially dissolved or liquefied. As chemical contaminants may have dried on the objects prior to processing, solid chemical contaminants may then be transformed into semi solids or liquid state on the shredded fragments 104 by the steam emitted by the steamer unit 200.

As the shredded fragments 104 are now highly moisturized, when the shredded fragments 104 are delivered into the separating module 106, the spinning cylinder of the separating module 106 is arranged to spin the fragments 104 so as to spin dry the fragments 104. In this process, the chemical contaminants 108, which would likely to be in liquid form, will be spun away from the solids pieces 110 of the shredded fragments 104 with the relatively dried shredded fragments 110 moving generally upwards in the spinning cylinder whilst the liquid chemical contaminates 108 are released to the side or fall to the bottom of the spinning cylinder 220. These liquid chemical contaminates 108 are then collected for processing, recycling or disposal whilst the shredded fragments 110 which are now decontaminated from the original chemical contaminants may be blown dry 304 whilst on a conveyor belt to be transferred to a vibrating unit 301.

The blow drying is a preferable process step as it dries the fragments 110 so that it allows further processing by the vibrating unit 301. In one embodiment, the vibrating unit 301 includes an oscillating or vibrating tray and a plurality of apertures on the base of the tray to allow smaller fragments to be loosened or removed. In this example, once the shredded fragments 110 reach the vibrating unit 301, the unit applies a vibration or oscillating force on each of the shredded fragments 110. After which a metal separating module, which may comprise a metallic tube roller 310 may be used to separate the metallic fragments 110M from the shredded fragments 110, leaving plastic fragments 110P and lighter fragments such as sponge and paper fragments 110S to remain in the shredded fragments 110.

In this example, as lighter fragments such as sponge and paper fragments 110S are generally lighter than the plastic fragments 110P, a suction or blower 308 may be used to blow or suck away the lighter fragments 110S away from the shredded fragments 110. Once this is completed, the remaining fragments should largely be plastic fragments 110P which may then be collected for disposal or further processing.

Figure 4:
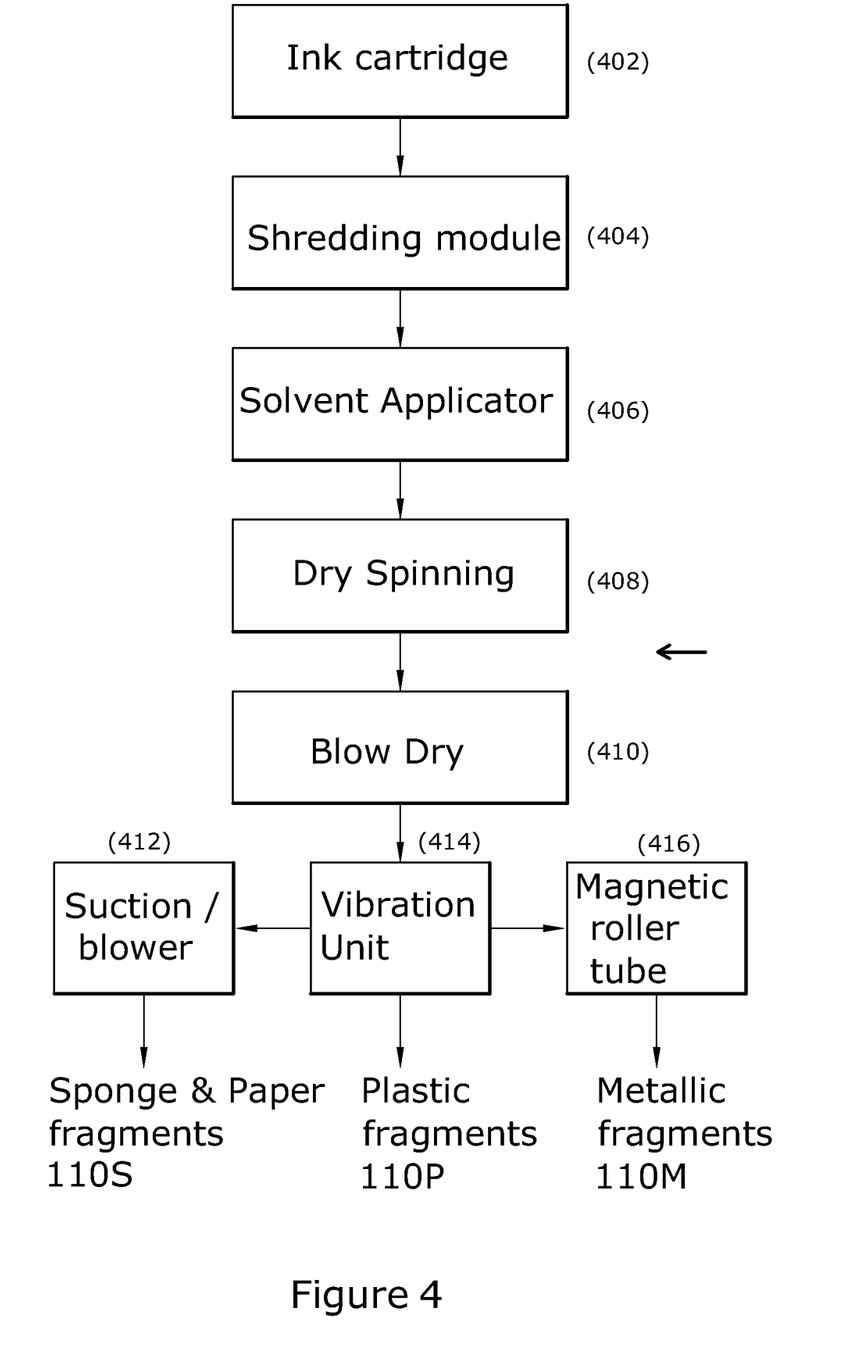
FIG. 4 is a flow diagram illustrating the process steps executed by the system shown in FIG. 3 in processing used ink cartridges.

With reference to FIG. 4 there is provided a flow diagram in which an ink cartridge can be processed by the system 300 shown in FIG. 3. As shown, an ink cartridge (402) is firstly shredded (404), then after which a solvent is applied to the shredded fragments to dissolve the ink which is disposed on the shredded fragments (406). Preferably, the solvent used is steam which is emitted by a steamer unit 200 onto the shredded fragments. By using steam as a solvent, the costs and environment harm can be minimized.

After which the ink on the shredded fragments 104 are at least partially dissolved or liquefied in the case of dried ink disposed in used ink cartridges, the ink can then be removed from the shredded fragments 104 by use of a dry spinning process (406) executed by the spinner unit of the separating module 106. After the separation is completed, the fragments 110 may be dried further by a blower which is arranged to blow dry the fragments 110 (410). By blow drying the fragments, the subsequent separation processes can be made more effective.

The shredded fragments 110 by this stage should have had most of its chemical contaminates (ink) removed. However plastic fragments 110P, sponge and paper fragments 110S and metallic fragments used in ink cartridges or containers may still remain in the shredded fragments 110. In this embodiment a suction or a blower is used to remove lighter fragments such as sponge and paper fragments 110S away from the shredded fragments 110 whilst a vibration unit is used to generally loosen and dislodge the shredded fragments 110 to separate each of the pieces for individual processing (412) (414). Finally a metallic roll tube may be used to remove any metallic fragments from the shredded fragments 110 (416).

The results of these processes would effectively allow one or more used ink cartridges or containers to be separated into multiple key materials, including the residual ink, plastics, metals and lighter components like sponges and paper components. This would allow the components to be further processed, disposed or recycled without the contaminating residual ink which would otherwise render the cartridges an environmental problem.

In alternative embodiments, each of the modules which are shown in FIG. 3 and individual steps labelled in FIG. 4 and shown in modules references 1 to 8 in FIG. 3 may be removed or modified in accordance with the necessary requirement of processing objects having chemical contaminates. In certain examples, the steamer unit 200 may not be considered necessary as in some cases the chemical contaminants do not need to be liquefied or dissolved. In some embodiments, suction may also be used to remove the chemical contaminants from the shredded components 104. This is particularly helpful in cases where the chemical contaminants are not easily dissolved or are already substantially in liquid state.

In other examples each of these individual modules may be removed or modified to process a larger volume of objects having chemical contaminates.

These embodiments are advantageous in that the system for processing objects having chemical contamination is a complete extraction and separation of ink (oil-based or water-based in nature) from materials without the use of chemical solvents. In addition, separation of sponge, paper, metals and plastic is possible and therefore allowing a superior form of recycling once these materials are separated. Furthermore, the system 100, 300 is arranged to be modular such that individual modules shown in FIG. 4 or as referenced as individual modular steps 1 to 8 in FIG. 3 can be removed or increased in capacity so as to process different volumes of ink cartridges or other types of objects which have chemical contaminates.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for processing objects having chemical contaminates comprising:
    a shredder, wherein the shredder shreds the objects into shredded fragments having chemical contaminates thereon;
    a steamer, wherein the steamer emits steam to the shredded fragments such that the steam substantially dissolves the chemical contaminates on the shredded fragments into chemical contaminates in liquid form;
    a spinner, wherein the spinner spins the shredded fragments to separate the chemical contaminates in liquid form from the shredded fragments in solid form; and
    wherein the spinner includes a spinnable cylinder having a neck portion between an upper portion and a lower portion, the lower portion having apertures a curved sidewall thereof, wherein the shredded fragments and chemical contaminates in liquid form enter the spinnable cylinder at the neck portion, and wherein the spinnable cylinder is spinnable so that the chemical contaminates substantially depart from the lower portion of the spinnable cylinder through the apertures and the shredded fragments substantially depart from the upper portion of the spinnable cylinder, due to centrifugal forces generated during spinning, the neck portion having a curve that guides the denser chemical contaminants in liquid form to the lower portion of the spinnable cylinder and guides the less dense shredded fragments to the upper portion to exit at an opening at a top of the upper portion;

a conveyor belt arranged to deliver the shredded fragments from the shredder to the spinner, wherein the steamer delivers steam to the shredded fragments with the chemical contaminates when the shredded fragments are on the conveyor belt; and a dryer, wherein the dryer reduces the moisture of the shredded fragments;

wherein the objects having chemical contaminates are used ink cartridges, and the chemical contaminates include oil-based ink or water-based ink.

2. The system in accordance with claim 1, wherein the conveyor belt is integrated with the steamer so as to deliver steam directly onto the shredded fragments on the conveyor belt.

3. The system in accordance with claim 1, wherein the dryer supplies airflow to the shredded fragments.

4. The system in accordance with claim 1 further comprising a metal separator, wherein the metal separator separates metallic fragments from the shredded fragments.

5. The system in accordance with claim 4, wherein the metal separator includes a magnetic roller tube, the magnetic roller tube removes the metallic fragments by rolling over the shredded fragments and removing the metallic fragments by magnetic force.

6. The system in accordance with claim 1 further comprising a light fragment remover, wherein the light fragment remover removes light fragments from the shredded fragments.

7. The system in accordance with claim 6, wherein the light fragment remover includes a blower unit, wherein the blower unit blows the light fragments away from the shredded fragments.

8. The system in accordance with claim 6, wherein the light fragment remover includes a suction unit, wherein the suction unit sucks away the light fragments from the shredded fragments.

9. The system in accordance with claim 6, wherein the light fragments include sponges, paper fragments or a combination thereof.

10. The system in accordance with claim 1 further comprising a vibrator, wherein the vibrator disturbs the shredded fragments.

11. A method for processing objects having chemical contaminates comprising the steps of:

utilizing a shredder to shred the objects to form a plurality of shredded fragments each having the chemical contaminates thereon;

utilizing a steamer to emit steam to the shredded fragments such that the steam substantially dissolves the chemical contaminates on the shredded fragments into chemical contaminates in liquid form;

utilizing a spinner having a spinnable cylinder with a neck portion between an upper portion and a lower portion, the lower portion having a curved sidewall having apertures therein, wherein the shredded fragments and chemical contaminates in liquid form enter the spinnable cylinder at the neck portion, and wherein the spinnable cylinder spins so as to separate the chemical contaminates in liquid form from the shredded fragments in solid form, the chemical contaminates substantially depart from the lower portion of the spinnable cylinder, through the apertures and the shredded fragments substantially depart from the upper portion of the spinnable cylinder due to centrifugal forces generated when the spinner spins, the neck portion having a curve that guides the denser contaminants in liquid form to the lower portion of the spinnable cylinder and guides the less dense shredded fragments to the upper portion to exit at an opening at a top of the upper portion;

utilizing a conveyor belt to deliver the shredded fragments from the shredder to the spinner, and delivering steam to the shredded fragments with the chemical contaminates when the shredded fragments are on the conveyor belt; and utilizing a dryer to reduce the moisture of the shredded fragments;

wherein the objects having chemical contaminates are used ink cartridges and the chemical contaminates includes oil-based ink or water-based ink.

12. A method in accordance with claim 11, wherein, in the step of utilizing a steamer, the chemical contaminates are substantially dissolved before the chemical contaminates are separated from the shredded fragments.

13. A method in accordance with claim 11, wherein the step of utilizing a dryer uses the dryer to supply airflow to the shredded fragments.

* * * * *